United States Patent [19]

Duffy

[11] Patent Number: 4,516,471
[45] Date of Patent: May 14, 1985

[54] POWER STEERING VALVE WITH CHAMFERED LANDS

[75] Inventor: James J. Duffy, Livonia, Mich.

[73] Assignee: Ford Motor Company, Dearborn, Mich.

[21] Appl. No.: 335,123

[22] Filed: Dec. 28, 1981

[51] Int. Cl.$^3$ .............................................. F15B 9/10
[52] U.S. Cl. .................................. 91/375 A; 91/467; 137/596.12; 251/121
[58] Field of Search .......................... 91/375 A, 467; 137/596.12, 625.69; 251/121

[56] References Cited

U.S. PATENT DOCUMENTS

| | | | |
|---|---|---|---|
| 2,919,681 | 1/1960 | Schultz | 137/596.12 |
| 3,022,772 | 2/1962 | Zeigler et al. | 91/375 A |
| 3,312,246 | 4/1967 | Tarn | 137/625.69 |
| 3,516,437 | 6/1970 | Folkerts | 137/596 |
| 3,645,494 | 2/1972 | Stelzer | 251/121 |
| 3,746,045 | 7/1973 | Bunker et al. | 137/625.24 |
| 4,063,490 | 12/1977 | Duffy | 91/467 |
| 4,137,989 | 2/1979 | Rehfeld | 91/375 A |
| 4,232,586 | 11/1980 | Elser | 91/467 |
| 4,353,288 | 10/1982 | Holub | 91/467 |

FOREIGN PATENT DOCUMENTS 2042442 9/1980 United Kingdom ............. 91/375 A

Primary Examiner—William R. Cline
Assistant Examiner—Randolph A. Smith
Attorney, Agent, or Firm—Harrington, Donald J.; Keith L. Zerschling

[57] ABSTRACT

A power steering gear for controlling the dirigible wheels of an automotive vehicle comprising steering gear elements and a fluid motor adapted to drive the steering gear elements to supplement the manual steering effort comprising a rotary valve assembly for controlling distribution of steering pressure from a pressure source to the fluid motor including a sleeve element and a spool element, each valve element having cooperating lands for controlling distribution of pressurized fluid therethrough to effect a pressure buildup in a pressure supply port that communicates with a working chamber of the fluid motor and chamfered surfaces on the valve lands of the internal valve element whereby pressure drop in the pressurized fluid circulated through the valve system and fluid noise is reduced and response of the valve system to steering maneuvers is improved.

6 Claims, 14 Drawing Figures

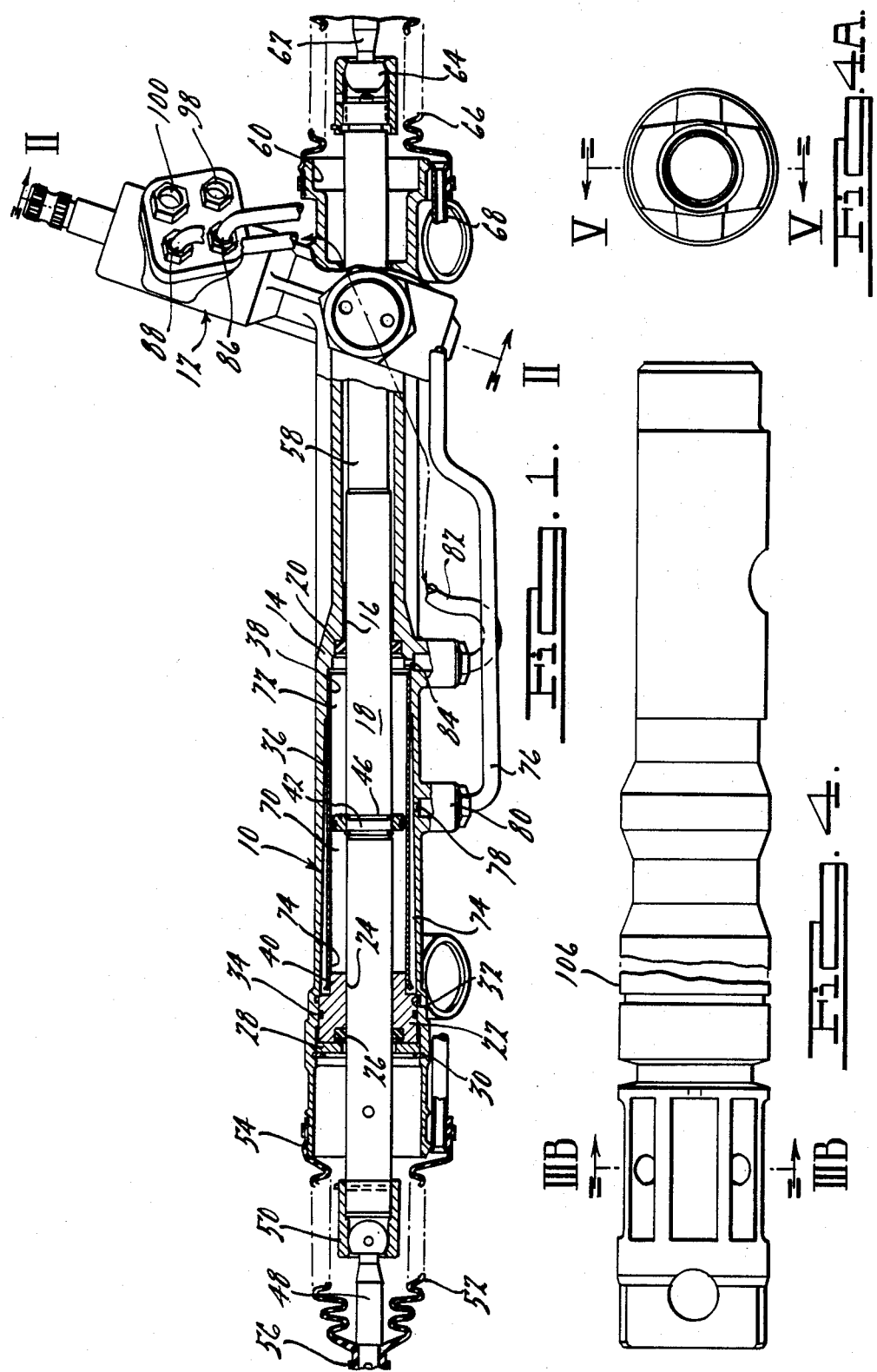

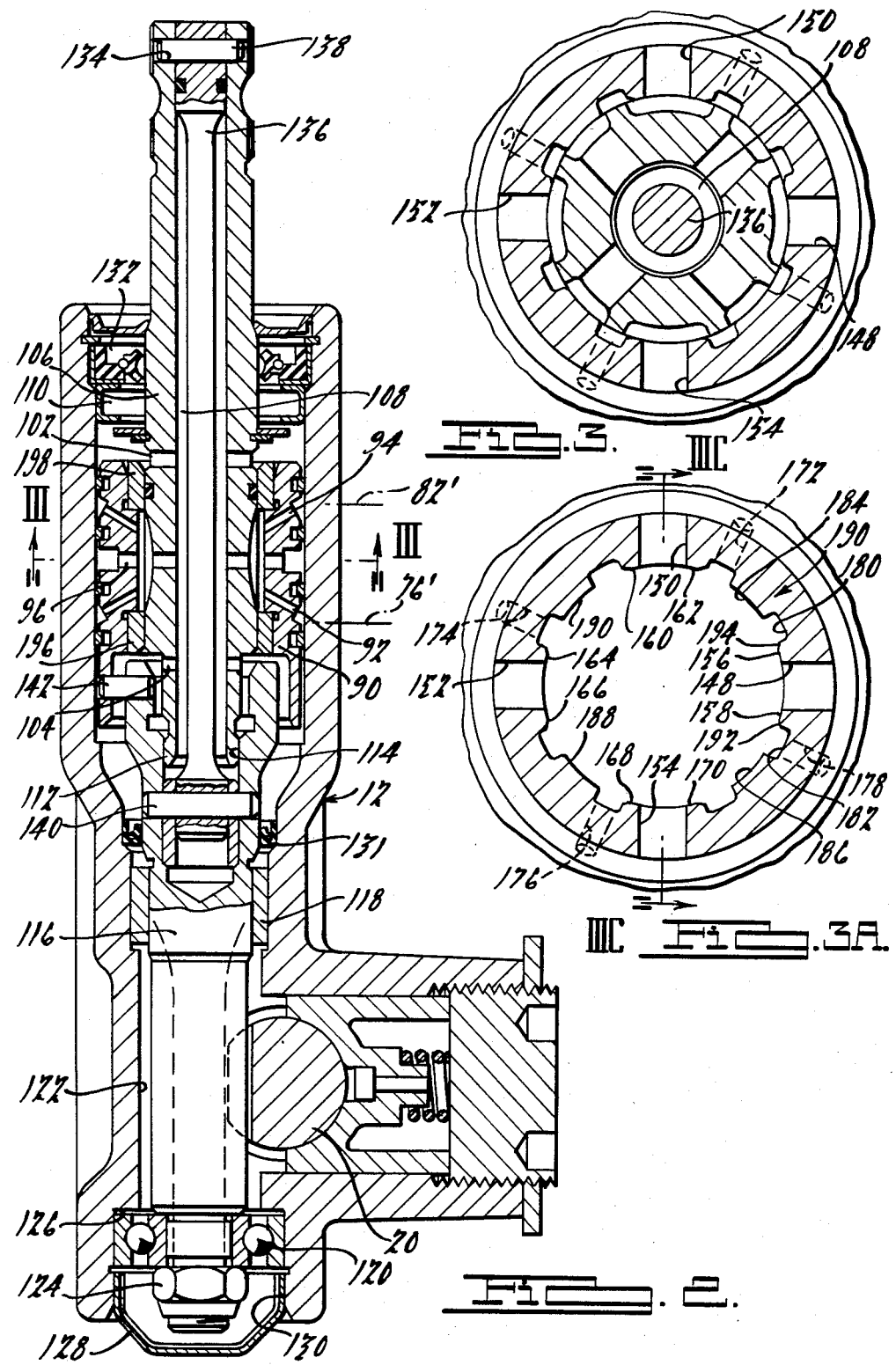

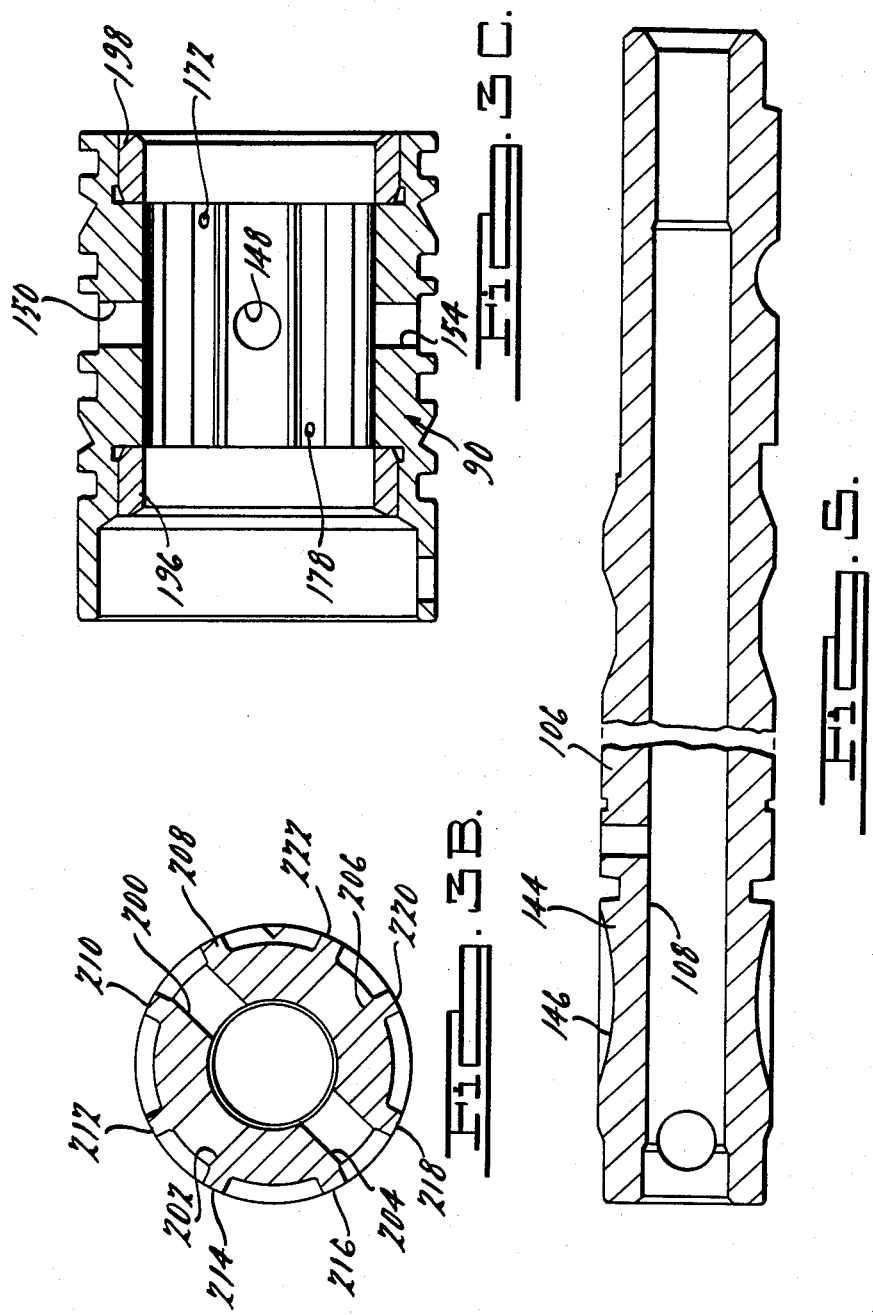

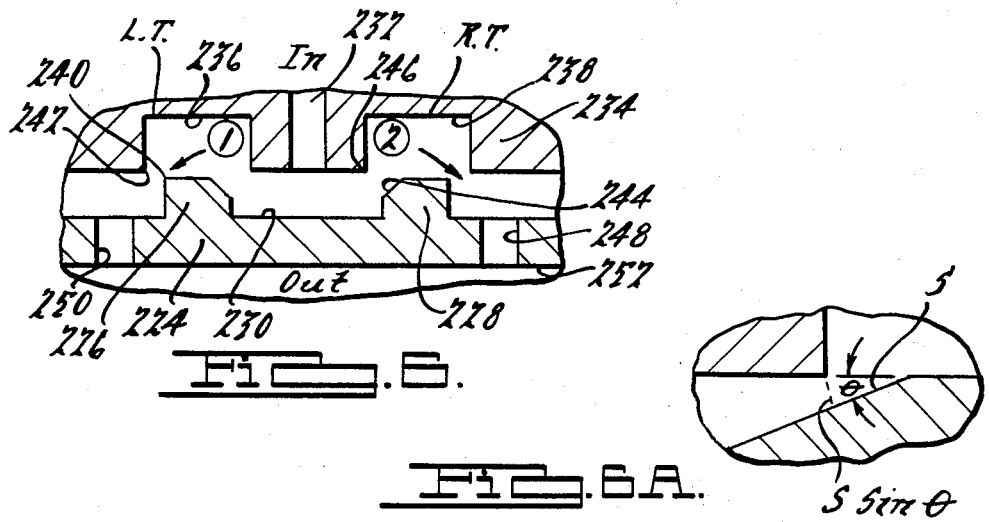
FIG. 6.
FIG. 6A.
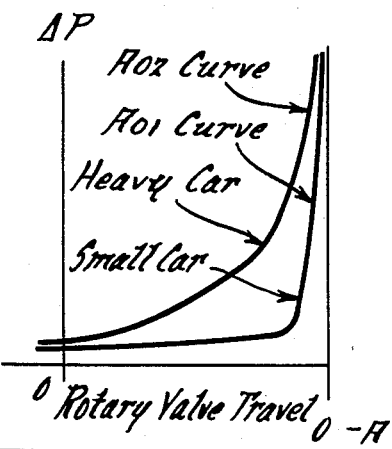
FIG. 7.
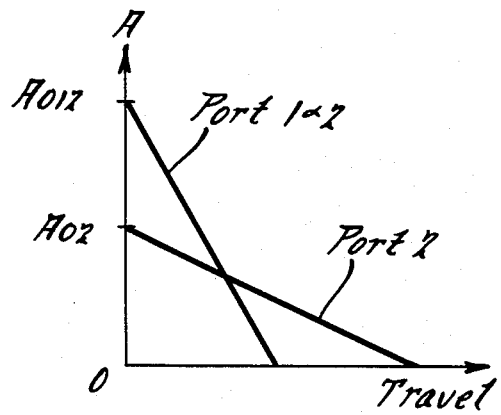
FIG. 8.
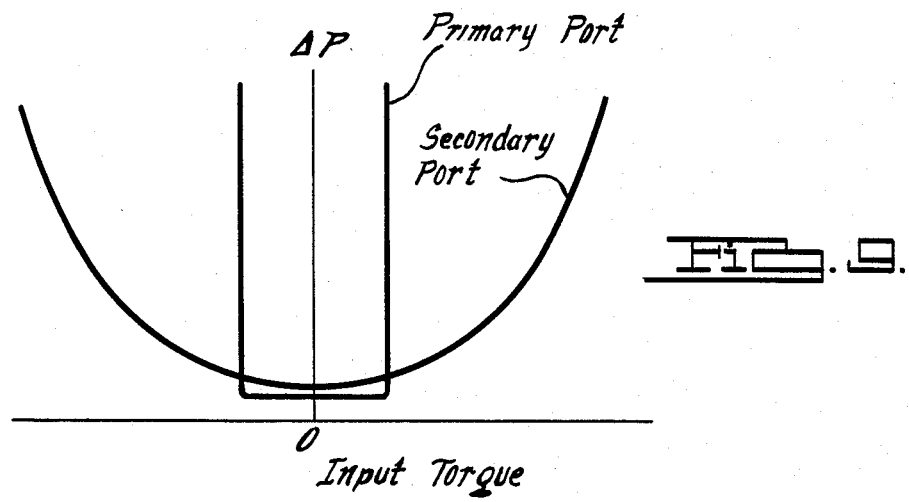
FIG. 9.

POWER STEERING VALVE WITH CHAMFERED LANDS

GENERAL DESCRIPTION OF THE INVENTION

My invention comprises improvements in power steering systems and more particularly to an improved valve structure for controlling distribution of pressurized fluid from a power steering pump to the fluid motor of a power steering system in an automotive vehicle. The improvements of my invention are adapted to be used in a steering gear mechanism of the type shown, for example, in my U.S. Pat. No. 4,063,490, dated Dec. 20, 1977, which is assigned to the assignee of this invention. That patent discloses a rack and pinion steering gear mechanism for use in the steering linkage mechanism of an automotive vehicle, but the improvements of my invention may be adapted also to a rotary valve mechanism for sector gear steering systems such as that shown in U.S. Pat. No. 3,227,178, which also is assigned to the assignee of this invention, and in U.S. Pat. No. 3,516,437 (Folkerts). Other examples of rotary valves in power steering systems that may provide a structural environment for the improvements of my invention are seen in U.S. Pat. Nos. 3,746,045; 3,680,443 and 3,807,456.

The steering system shown in U.S. Pat. No. 4,063,490 comprises a power cylinder that cooperates with a piston to define a pair of opposed working chambers. The piston is carried on a piston rod that is joined to or is integral with a gear rack that engages a pinion. A rotary valve mechanism is used to control distribution of pressure to the working chambers of the fluid motor to provide a powered assist to the manual steering effort applied to the pinion. The rotary valve structure, which is located in a power steering valve housing, includes a valve sleeve having internal valve lands and a rotary valve spool having external valve lands that register with the internal valve lands of the valve sleeve. The spool is connected to a driver controlled input shaft, the latter in turn being connected to a pinion through a torsion bar that deflects one way or the other depending upon the direction of the applied torque to provide relative angular displacement of the pinion with respect to the external valve lands. The sleeve is joined to the pinion for common rotary adjustment. When this occurs, the lands of the external valve element are displaced relative to the lands of the valve sleeve thereby controlling distribution of pressurized fluid to either one chamber of the fluid motor or the other. The magnitude of the pressure differential across the fluid piston is determined by the magnitude of the torque which in turn determines the relative position of the internal and external valve lands.

In manufacturing rotary valve elements the lands of the inner valve spool are formed in the periphery of the valve element at angularly spaced locations by means of a milling cutter. This produces a crescent shaped opening between the lands of the valve spool. The lands themselves register with straight lands in the valve sleeve. The pumps used in such power steering systems are positive displacement pumps that deliver a constant flow through the rotary power steering valve. The valve lands of the spool and the sleeve may be arranged so that flow occurs when the valve lands are positioned in a centered relationship. This is known as an opencenter valve system that distributes pressure to the left turn cylinder or the right turn cylinder and gradually closes the return flow path into the reservoir depending upon the direction of the applied torque on the torque input shaft. The rotary valve port closing rate controls the relationship of the pressure increase in one cylinder pressure chamber to the valve travel. The geometry of the lands can be chosen so that a reduced rate of port area change occurs when the valve lands are positioned near their closed positions thereby avoiding an undesirable rapid rise of pressure. On the other hand, a more rapid rate of port area change is desired near the center in order to reduce the pump back pressure during centered steering. Thus two port area change rates are desirable. A rate change that is relatively rapid should occur when the valve is near the center position and a slower area change rate should occur when the valve lands are near the closed position. In an attempt to achieve this condition small secondary chamfer widths in rotary valve designs have been used, an example being valve chamfers shown at 150 and 152 in FIGS. 3 and 4 of reference U.S. Pat. No. 4,063,490. The flow rate across the registering valve lands with such chamfered land designs tends to create a substantial back pressure in the fluid flow system which tends to increase the parasitic horsepower loss. It also creates noise because of the high fluid mass flow per linear inch of valve land.

It is an object of my present invention to reduce the rate of flow per linear inch of valve land and to provide a reduced area rate change when the valve lands approach their closed positions. This is done by providing wider secondary valve chamfers that disperse the fluid flow over a larger port width, thus reducing the noise due to transfer of high pressure fluid during steering maneuvers.

The chamfers on the valve lands of my invention are placed on the internal valve sleeve lands and they may be formed with the same broaching operation and broaching tool used to form the lands themselves. A relatively long metering edge throughout the entire length of the valve land thus can be made. This is in contrast to the shorter, variable-depth lands that are machined in certain known rotary valve designs that employ chamfered lands on the external valve member or input shaft valve that registers with the valve sleeve.

The valve lands on the input shaft valve in prior art rotary valve designs are machined by a milling cutter. The flow that occurs over such valve lands has a relatively short axial extent. The resulting effective valve width when the registering valve lands approach their closed positions is slight. The reduced port length results in undesirable valve noise because of the high mass flow per inch of high pressure port length. In a present production Ford Motor Company Escort vehicle using a transversely broached input shaft valve land design the flow per inch is about 3 gallons per minute compared to 0.7 gallons per minute for the broached internal land sleeve chamfer design of my present invention assuming all other design criteria are constant. The reduced pressure drop in the steering system, furthermore, results in a lower parasitic loss in the vehicle steering system thereby improving fuel economy because of the resulting reduced horsepower required to drive the power steering pump. The broached slots in the valve sleeve with full length chamfers on the edges of the slots provide four-way valves in parallel to produce a uniform reduced fluid flow for each linear increment of valve land length.

BRIEF DESCRIPTION OF THE FIGURES OF THE DRAWINGS

FIG. 1 is a cross-sectional assembly view of a rack-and-pinion power steering gear having a pressure distributer valve capable of embodying the improvements of my invention.

FIG. 2 is a cross-sectional view taken along the plane of section line 2—2 of FIG. 1.

FIG. 3 is a schematic cross-sectional view of the rotary valve assembly as seen from the plane of section line 3—3 of FIG. 2.

FIG. 3A is a cross-sectional view of a rotary valve sleeve for a preferred working embodiment of the invention. It corresponds to the rotary valve sleeve shown schematically in FIG. 3.

FIG. 3B is a cross-sectional view of the inner valve spool of FIG. 3.

FIG. 3C is a cross-sectional view of a rotary valve spool of a preferred working embodiment of the invention. It corresponds to the spool shown schematically in FIG. 3.

FIG. 4 is a side elevation view of the rotary shaft valve that registers with the valve sleeve of FIG. 3A.

FIG. 4A is an end view of the shaft valve shown in FIG. 4.

FIG. 5 is a cross-sectional view of the valve of FIG. 4 as seen from the plane of section line 5—5 of FIG. 4A.

FIG. 6 is a schematic diagram illustrating the geometry of the registering lands of a rotary valve assembly, although for purposes of the diagram chamfers are shown in valve lands on a sliding valve element in a stationary valve sleeve.

FIG. 6A is a detail view showing an enlargement of the registering valve lands for the valve assembly schematically represented in FIG. 6.

FIG. 7 is a characteristic curve in which the power steering pressure is developed in a steering system having a valve of the type shown in FIG. 6.

FIG. 8 is a graph showing the relationship between port area and valve travel for the valve assembly of FIG. 6.

FIG. 9 is a graph showing the relationship between pressure build-up and valve torque for the valve assembly of FIG. 6.

PARTICULAR DESCRIPTION OF THE INVENTION

In FIG. 1 I have shown a rack-and-pinion power steering gear assembly that comprises a first housing portion 10 that encloses the fluid motor of the gear assembly and a valve housing portion 12 enclosing the rotary valve elements of my invention. Housing portions 10 and 12 by preference are formed as a single casting. Housing portion 10 has a gradual taper, as seen best in FIG. 1, to facilitate the removal of the internal die during the die casting operation. Housing portion 10 has an intermediate wall 14 which is formed with an internal opening 16 through which is received piston shaft 18. A clearance is provided between the shaft 18 and the wall of the opening 16. The opening is sealed by a seal member 20 positioned in seal pocket in the wall 14 and slidably engaging the shaft 18.

The outboard end of the housing portion 10 receives therein a closure ring 22. A shaft opening 24 is formed in the ring 22, and shaft 18 is slidably mounted in it. Seal 26 surrounds shaft 24 and is positioned in the seal pocket formed in the seal ring 22. Ring 22 is held axially fast by backup plate 28 which is retained by a retainer snap ring 30 located in a snap ring groove formed in the interior of the housing portion 10. The ring 22 is retained also by a shoulder 32 formed in the interior of the housing portion 10. Peripheral seal 34 prevents transfer of pressurized fluid across the ring 22.

The housing is formed of cast aluminum alloy. A steel sleeve 36 is located in the cast aluminum alloy housing portion 10 and it is located and secured at the right hand end thereof in cylindrical portion 38 located adjacent the intermediate wall 14. The left hand end of the sleeve 36 surrounds and is supported by a circular stationary sleeve 40 formed on the ring 22. Shaft 18 carries at the intermediate location thereon a piston 42 which is held axially fast by retainer rings in retainer grooves 46. The outboard end of the shaft 18 is secured to a steering link 48 by a ball and socket connection 50. The ball and socket connection 50 is protected by a flexible rubber boot 52 which surrounds the outer end of the housing portion 10, as seen at 54, and which is secured to the link 48 as seen at 56.

A gear rack 58 is formed on the right hand end of the shaft 18 and is an integral part of the shaft. Rack 58 extends through an opening 60 formed in the right hand end of the housing portion 10. The right hand end of the rack 58 is secured to a second steering gear linkage element 62 by a ball-and-socket connection 64. Connection 64 may be a duplicate of the connection 50. It is protected by a flexible boot 66 which corresponds to the flexible boot 52 at the left hand side of the assembly of FIG. 1. A pressure equalizer tube 68 extends generally parallel to the housing portion 10 and provides a pneumatic connection between the interior of the boot 66 and the interior of the boot 52 so that as air is displaced upon movement of the linkage 62 in a left hand direction it may be transferred to the expanding volume of boot 52. The converse also is true upon movement of the linkage element 48 in a right hand direction.

The piston 42 divides the annular space defined by the shaft 18 and the cylinder 36 into two pressure chambers identified by reference characters 70 and 72. A pressure distributor passage 74 is defined by the housing portion 10 and the cylinder 36. This passage surrounds the cylinder 36 and communicates with the pressure chamber 70 through port 74. A left turn fluid conduit 76 is connected also to the passage 74 through port 78, the end of the conduit 76 being secured to the housing portion 10 by fluid fitting 80. A right turn fluid pressure conduit 82 communicates with port 84 in the housing portion 10 thereby establishing communication between conduit 82 and pressure chamber 72. The opposite ends of the conduits 76 and 82 are connected by fluid fittings 86 and 88 respectively to housing portion 12.

As seen in FIG. 2, housing portion 12 encloses valve sleeve 90 which will be described subsequently with reference to FIG. 3A and 4. Conduit 76, the centerline of which is identified in FIG. 2 by the reference character 76', communicates with valve port 92 in the valve sleeve 90. Similarly, conduit 82, the centerline of which is identified in FIG. 2 by reference character 82', communicates with valve port 94 in the valve sleeve 90. Circular seal rings are situated on either side of the port 92 and on either side of the port 94. Fluid pressure from a power steering pump, not shown, is distributed through a fluid pressure conduit to port 96 formed in the valve sleeve 90. That pressure conduit is connected to the housing portion 12 by means of a fluid fitting shown in FIG. 1 at 98. A fluid return passage to the reservoir of the pump is connected to the housing portion 12 by means of fluid fitting 100 shown in FIG. 1. That flow return conduit communicates with ports 102 and 104 in the shaft valve 106 shown in FIG. 2 thus providing fluid communication between the reservoir conduit and the central opening 108 in the shaft valve 106.

Shaft valve 106 is journalled in the housing 12 by bearing 110 near the outboard end thereof and by the pilot 112 at the inboard end thereof. Pilot 112 is received in bearing opening 114 formed in pinion shaft 116. Pinion shaft 116 in turn is journalled by a roller bearing 118 and a ball bearing 120 in pinion opening 122 in the housing portion 12. The end of the pinion shaft 116 is threaded to accommodate a retainer nut 124 which acts as a thrust shoulder that engages the inner race of the bearing 120, the thrust forces being distributed through the bearing to reaction shoulder 126 on the housing portion 12. The bearing is closed by a bearing closure member 128 secured to the end opening 130 of the housing portion 12. The space on the outboard side of the bearing 118 is sealed from the space occupied by the valve sleeve 90 by a fluid seal 131. Similarly, the space on the right hand side of the valve sleeve 90 is sealed by seal member 132 to prevent leakage of fluid under pressure to the exterior of the housing 12.

The shaft valve 106 extends outwardly from the housing portion 12 and is splined at 134 to permit a driving connection with a manually controlled steering shaft located within the shaft valve opening 108. A torsion rod torque transmitting member 136 is pinned at 138 to the outboard end of the shaft valve. The inboard end of the torsion rod member 136 is pinned at 140 to the pinion shaft 116. Thus as torque is applied to the steering shaft and transmitted through the torsion rod member to pinion shaft 116, the shaft valve will be displaced angularly with respect to the valve sleeve 90. The magnitude of the angular displacement of the shaft valve with respect to the sleeve 90 is a measure of the torque applied to the steering shaft. A lost motion, positive-driving connection is provided between pilot portion 112 and the inboard end of the pinion shaft 116. Thus torque is distributed directly from the driving shaft to the pinion shaft when the torsion rod member 136 is deflected to its limiting value.

Valve sleeve 90 rotates in unison with the pinion shaft 116 by reason of the pinned connection provided by drive pin 142.

Upon deflection of the torsion rod member 136 shaft valve 106 becomes angularly displaced with respect to the valve sleeve 90. A shaft valve is shown in FIGS. 4, 4A and 5. It comprises a valve portion 144 having milled valve slots 146 which define valve lands, best seen in FIG. 3B. As seen in FIG. 3B, there are 8 valve lands equally spaced about the geometric axis of the shaft. The sleeve valve element has four inlet ports spaced about the axis of the shaft at ninety degree intervals as seen at 148, 150, 152 and 154. Port 148 is located between adjacent internal valve lands 156 and 158, port 150 is located between adjacent valve ports 160 and 162, valve 152 is located between valve lands 164 and 166 and port 154 is located between valve lands 168 and 170.

Valve sleeve 90 also has four angularly spaced outlet ports as seen at 172, 174, 176 and 178. These also are spaced at ninety degree intervals and each of them communicates with a groove in the valve sleeve adjacent one of the radial inlet ports 150, 152 and 154 or 148. In the embodiment shown in FIG. 3A, internal valve land in the valve sleeve 90 located between longitudinal grooves 180 and 182 is wider than the two adjacent lands 184 and 186, respectively. Likewise the land in which port 154 is located is wider than its adjacent lands 186 and 188. The land that communicates with port 152 is wider than adjacent lands 188 and 190, and the land that communicates with port 150 is wider than adjacent lands 190 and 184.

The corners of the valve lands adjacent inlet port 148 are chamfered as shown at 192 and 194. The corner of the valve land on the opposite side of groove 180 is not chamfered as seen in FIG. 3A. Likewise the opposite side of groove 182 is not chamfered. The valve lands adjacent each of the other inlet ports 150, 152 and 154 also are chamfered at their respective corners in a similar fashion. Thus each longitudinal groove in the valve sleeve has one chamfered corner and one sharp corner.

The grooves in the valve sleeve, as well as the chamfers on the valve land corners, can be formed during a broaching operation. After the broaching operation is complete, end rings 196 and 198 are inserted with a pressed fit into cylindrical end recesses in the interior of the valve sleeve at each end of the broached grooves.

The shaft valve that is positioned within the valve sleeve is shown in FIGS. 4, 5 and 3B. The eight external valve lands are shown best in FIG. 3B. The lands are formed by a milling cutter that machines crescent shaped recesses, best seen in FIGS. 4 and 5, at evenly spaced locations about the axis of the shaft. Four radial outlet ports spaced at ninety degree intervals are formed in the shaft valve as seen in FIG. 3B at 200, 202, 204 and 206. The assembly of the shaft valve in the valve sleeve is shown schematically in FIG. 3. The radial ports 200 through 206 communicate directly with the low pressure passage 108 as seen in FIG. 2. The external valve lands defined by the milled slots in the shaft valve are identified in FIG. 3B by reference numerals 208 through 222.

The broaching operation for forming the internal valve lands of the sleeve produce a uniform land geometry throughout the length of the valve sleeve and produce slots between the lands of uniform depth. The chamfers on the edges of the valve lands also are of uniform geometry throughout the length of the sleeve and the width and the angle of the chamfers is closely controlled by the broaching tool.

When the shaft valve is displaced angularly with respect to the sleeve, a pressure build up occurs in one of the pressure chambers 70 or 72 of FIG. 1 thus effecting a right turn or a left turn depending upon the direction of the torque applied to the torsion rod. For purposes of understanding the mode of operation of the rotary valve and the significance of the chamfers in the valve sleeve, reference now will be made to FIGS. 6, 6A, 7, 8 and 9.

In FIG. 6 I have shown a linear configuration of registering valve lands in diagrammatic form. In FIG. 6 there is shown a valve spool 224 having two external lands 226 and 228. These lands are situated on either side of a groove 230 that communicates with a pressure inlet port 232 formed in a valve sleeve 234. A valve groove 236 communicates with the left turn pressure chamber of the fluid motor, and valve groove 238 communicates with the right turn pressure chamber of the fluid motor. Each groove 236 and 238 is formed in the valve sleeve. When the valve spool 224 is moved in a left hand direction, which would correspond to a left turn steering maneuver, the sharp edge 240 of valve lands approaches the sharp edge 242 on the valve land 236. Also the chamfered edge 244 on land 228 approaches edge 246 of the valve land defined by groove 238.

In the diagrammatic valve of FIG. 6 low pressure return ports 248 and 250 communicate with the central flow return passage 252 in the valve spool 224.

In a power steering system using a positive displacement pump the flow of fluid is constant, thus the pressure buildup that occurs in the left turn cylinder upon shifting movement of the spool 224 in a left hand direction depends upon the areas of the ports or passageways identified in FIG. 6 by the symbols 1 and 2.

Upon movement of the valve element 224 with respect to the valve element 234, the areas of passages 1 and 2 change in accordance with the relationship shown in FIG. 8. In FIG. 8 a separate plot is shown to illustrate the sum of the areas of passage 1 and 2 and the rate of change of those areas upon relative movement of the valve elements. FIG. 8 also shows the relationship of the change of area of passage 2 upon relative movement of the valve elements. At the point where the two linear plots intersect upon increasing valve travel for the valve element 224, the rate of pressure buildup in the working pressure chamber of the fluid motor is determined by the rate of change of the area 2. The actual pressure buildup, represented by the symbol $\Delta P$, can be computed as follows:

$$Q = \text{const.} = KA \sqrt{\Delta P} \tag{1}$$

$$\Delta P = K \left(\frac{Q}{A}\right)^2 = K' \frac{1}{A^2} \tag{2}$$

The pump and the pump flow control valve provide a flow Q that is constant as indicated in these equations (1) and (2). If equation (2) is plotted with the area for the lands on the abscissa and the pressure differential $\Delta P$ on the ordinate, the resulting characteristic is a parabolic curve.

FIG. 7 shows a parabolic curve plot representing the relationship between $\Delta P$ and valve travel for various values of the areas of the valve assembly. For a heavy car a relatively rapid rising parabolic relationship between valve travel and $\Delta P$ is desirable, but in a small car a flatter curve is desirable so that the vehicle operator will experience a greater degree of road feel during steering maneuvers with a vehicle traveling on a straight course. The fast rising portion of the curve for a small car indicates that the valve assembly will provide sufficient power assist for large degrees of valve travel such as the travel that is experienced during parking maneuvers and turning maneuvers at very slow speeds.

In FIG. 6A I have shown an enlarged view of the chamfer geometry. The area of the passage 2 is equal to S sin $\theta$ where $\theta$ is the angle of the chamfer and S is the distance between the tip of the chamfered land and the tip of the registering land of the valve element 234. The total valve area is equal to S sin $\theta$ times the length of the valve in the case of a rotary valve assembly in which the internal lands of the valve sleeve are chamfered as taught in this disclosure. Thus the full length of the valve land is effective to control fluid flow throughout the entire valve movement so that the flow per inch of valve length is relatively low in comparison to those valve designs that include chamfers on the external valve lands of a shaft valve. For example, if an attempt were made to chamfer the external valve lands produced by the hub cutter operation on the valve lands shown in FIG. 3B, the effective length of the valve land upon relative displacement of the valve elements would be a minimum at maximum valve element displacement; and it would be necessary, therefore, for a large volume of fluid to be passed over the relatively short valve length thereby producing concentrated mass flow, turbulence and valve noise. Furthermore, a high degree of pressure drop would be experienced and that results in inefficiency of the steering system which would adversely affect vehicle fuel economy because of the added horsepower required to drive the power steering pump as constant flow through the steering system is maintained by the pump and the pump flow control valve, not shown.

FIG. 9 shows another plot that illustrates that the geometry of the valve lands can be changed as desired to produce varying shapes of the valve travel versus pressure drop characteristic. The plot of FIG. 9, upon a given increment of travel of the valve element, results from an earlier closing of area 1 when compared to the closing time for a valve that has a characteristic of FIG. 7.

The improved performance of my improved valve system can be achieved without adding manufacturing complexity to the valve. In fact, the broaching operation for manufacturing the valve sleeve reduces manufacturing complexity in comparison to milling operations for forming the valve lands for rotary valves of known design. It is possible also to maintain the correct angle on the chamfers with a higher degree of accuracy using a broaching operation in forming the chamfers on the internal valve lands.

Having described a preferred embodiment of my invention, what I claim and desire to secure by U.S. Letters Patent is:

1. In a power steering gear comprising a fluid motor adapted to be connected to a driven member, said fluid motor having opposed fluid pressure chambers, a steering shaft, a positive displacement fluid pump, and a fluid circuit for controlling pressure distribution from said pump to said fluid motor;

a valve assembly in said fluid circuit comprising a rotary valve sleeve having internal valve lands, a rotary shaft valve connected to and rotatable with said steering shaft, and external valve lands on said shaft valve;

a yieldable mechanical connection between said steering shaft and said driven member, a positive driving connection between said valve sleeve and said driven member;

a fluid connection between said pump and said pressure chambers comprising a first passage extending from said valve assembly to one pressure chamber and a second passage extending from said valve assembly to the other pressure chamber, a fluid supply passage extending from said pump to said valve assembly and a fluid return passage between said valve assembly and a flow inlet region of said pump;

the external valve lands of said shaft valve registering with the internal valve lands of said valve sleeve whereby said registering lands define in part said first passage and said second passage, the internal valve lands on said sleeve adjacent said supply passage being chamfered throughout their length whereby a pressure buildup occurs in said pressure chambers at a controlled rate dependent on the torque applied to said steering shaft;

the external lands on said shaft valve being spaced angularly about the axis of said shaft valve and being formed by axially extending crescent-shaped grooves adapted to be formed by rotary milling cutter, the internal valve lands in said sleeve being straight-through lands defined by axially extending groove adapted to be formed by a linear broaching tool, the chamfer on said internal valve lands being of uniform dimension throughout their axial extent whereby said internal lands and said chamfers are adapted to be broached simultaneously with said linear broaching tool, and end rings in said valve sleeve on either axial end of said internal lands, said end rings having an internal diameter equal to the internal diameter of said internal lands.

2. The combination as set forth in claim 1 wherein said steering gear is a rack-and-pinion steering gear having a gear rack connected to pressure operated piston portions of said fluid motor, a pinion meshing with said rack and connected to said valve sleeve, said shaft valve having a central opening therein, and radial ports in said shaft valve providing controlled communication between said first and second passages and said central opening.

3. The combination as set forth in claim 1 wherein the degree of communication between said first passage and said supply passage is progressively decreased and the degree of communication between the second passage and said return passage is progressively decreased as said shaft valve is rotated relative to said valve sleeve in one direction.

4. The combination as set forth in claim 2 wherein the degree of communication between said first passage and said supply passage is progressively decreased and the degree of communication between the second passage and said return passage is progressively decreased as said shaft valve is rotated relative to said valve sleeve in one direction.

5. The combination as set forth in claim 3 wherein the degree of communication between said first passage and said return passage and the degree of communication between said second passage and said return passage is increased upon movement of said shaft valve relative to said valve sleeve in said one direction.

6. The combination as set forth in claim 5 wherein an internal valve land on said valve sleeve registers with an adjacent external valve land to provide communication between said return passage and said second passage, said external land being unchamfered, and an internal valve land on said valve sleeve registering with an adjacent external valve land to provide said communication between said supply passage and said first passage, said last mentioned internal land being chamfered throughout its length thereby providing a reduced flow per inch of valve land length with large angular displacements of said shaft valve relative to said valve sleeve.

* * * * *